US009438942B2

(12) United States Patent
Fragale et al.

(10) Patent No.: US 9,438,942 B2
(45) Date of Patent: Sep. 6, 2016

(54) CONFIGURABLE DIGITAL CONTENT STORAGE

(71) Applicant: Verizon Patent and Licensing Inc., Basking Ridge, NJ (US)

(72) Inventors: Joseph G. Fragale, Ridgewood, NJ (US); Sankar Subramanian, Ossining, NY (US); Daniel J. O'Callaghan, Fairfax Station, VA (US); Michael P. Ruffini, Methuen, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 95 days.

(21) Appl. No.: 14/196,478

(22) Filed: Mar. 4, 2014

(65) Prior Publication Data

US 2015/0256862 A1    Sep. 10, 2015

(51) Int. Cl.
| | | |
|---|---|---|
| *H04N 7/173* | (2011.01) |
| *H04N 7/18* | (2006.01) |
| *H04N 21/254* | (2011.01) |
| *H04N 21/647* | (2011.01) |
| *H04N 21/472* | (2011.01) |
| *H04N 21/262* | (2011.01) |
| *H04N 21/235* | (2011.01) |
| *H04N 21/239* | (2011.01) |
| *H04N 21/2747* | (2011.01) |
| *H04N 21/4147* | (2011.01) |
| *H04N 21/2347* | (2011.01) |
| *H04N 21/433* | (2011.01) |
| *H04N 21/437* | (2011.01) |
| *H04N 21/4627* | (2011.01) |
| *H04N 21/436* | (2011.01) |

(52) U.S. Cl.
CPC ...... *H04N 21/2541* (2013.01); *H04N 21/2347* (2013.01); *H04N 21/2353* (2013.01); *H04N 21/2393* (2013.01); *H04N 21/262* (2013.01); *H04N 21/2747* (2013.01); *H04N 21/4147* (2013.01); *H04N 21/437* (2013.01); *H04N 21/4334* (2013.01); *H04N 21/43615* (2013.01); *H04N 21/4627* (2013.01); *H04N 21/47217* (2013.01); *H04N 21/64761* (2013.01)

(58) Field of Classification Search
CPC ............... H04N 21/436; H04N 21/43615; H04N 21/43622; H04N 21/4363; H04N 21/43632
USPC .................................. 725/74, 78, 80, 82, 85
See application file for complete search history.

(56) References Cited

U.S. PATENT DOCUMENTS

| 7,362,760 B2 * | 4/2008 | Wang ................. H04L 29/12377 370/356 |
| 7,684,394 B1 * | 3/2010 | Cutbill .............. H04L 29/12066 370/389 |
| 2004/0218614 A1 * | 11/2004 | Yokomitsu ........ H04L 29/12009 370/401 |
| 2005/0086694 A1 * | 4/2005 | Hicks ..................... H04H 20/63 725/79 |
| 2006/0126613 A1 * | 6/2006 | Zweig ................. H04L 12/5692 370/389 |

(Continued)

*Primary Examiner* — James R Sheleheda

(57) ABSTRACT

A routing device is coupled to a storage device to function as a digital video recorder (DVR) to store digital content. The routing device may include a client function to receive and store the digital content, and a server function to provide the stored digital content to a user device. Digital content directed to the client function may be recorded by the storage device, while other digital content may be passed by server function to the user device. The digital content may be received by the routing device in an encoded and/or encrypted format, and the digital content may be recorded by the storage device in the encoded and/or encrypted format.

20 Claims, 10 Drawing Sheets

(56) References Cited

U.S. PATENT DOCUMENTS

| | | | |
|---|---|---|---|
| 2007/0081537 A1* | 4/2007 | Wheelock | 370/392 |
| 2009/0235317 A1* | 9/2009 | Igarashi | H04N 7/17309 725/82 |
| 2013/0198796 A1* | 8/2013 | Brooks | H04L 12/2898 725/129 |
| 2013/0298170 A1* | 11/2013 | ElArabawy et al. | 725/62 |
| 2014/0026170 A1* | 1/2014 | Francisco | H04L 12/2834 725/80 |
| 2014/0095924 A1* | 4/2014 | Holden | H04L 12/1868 714/4.11 |
| 2014/0250471 A1* | 9/2014 | Guerra | H04N 21/43615 725/82 |
| 2014/0351846 A1* | 11/2014 | Dang | H04N 21/44204 725/28 |
| 2015/0256862 A1* | 9/2015 | Fragale | H04N 21/2541 725/54 |
| 2015/0312727 A1* | 10/2015 | Kish | H04N 21/6405 370/312 |
| 2015/0350291 A1* | 12/2015 | Contreras Murillo | H04L 67/2814 709/219 |

* cited by examiner

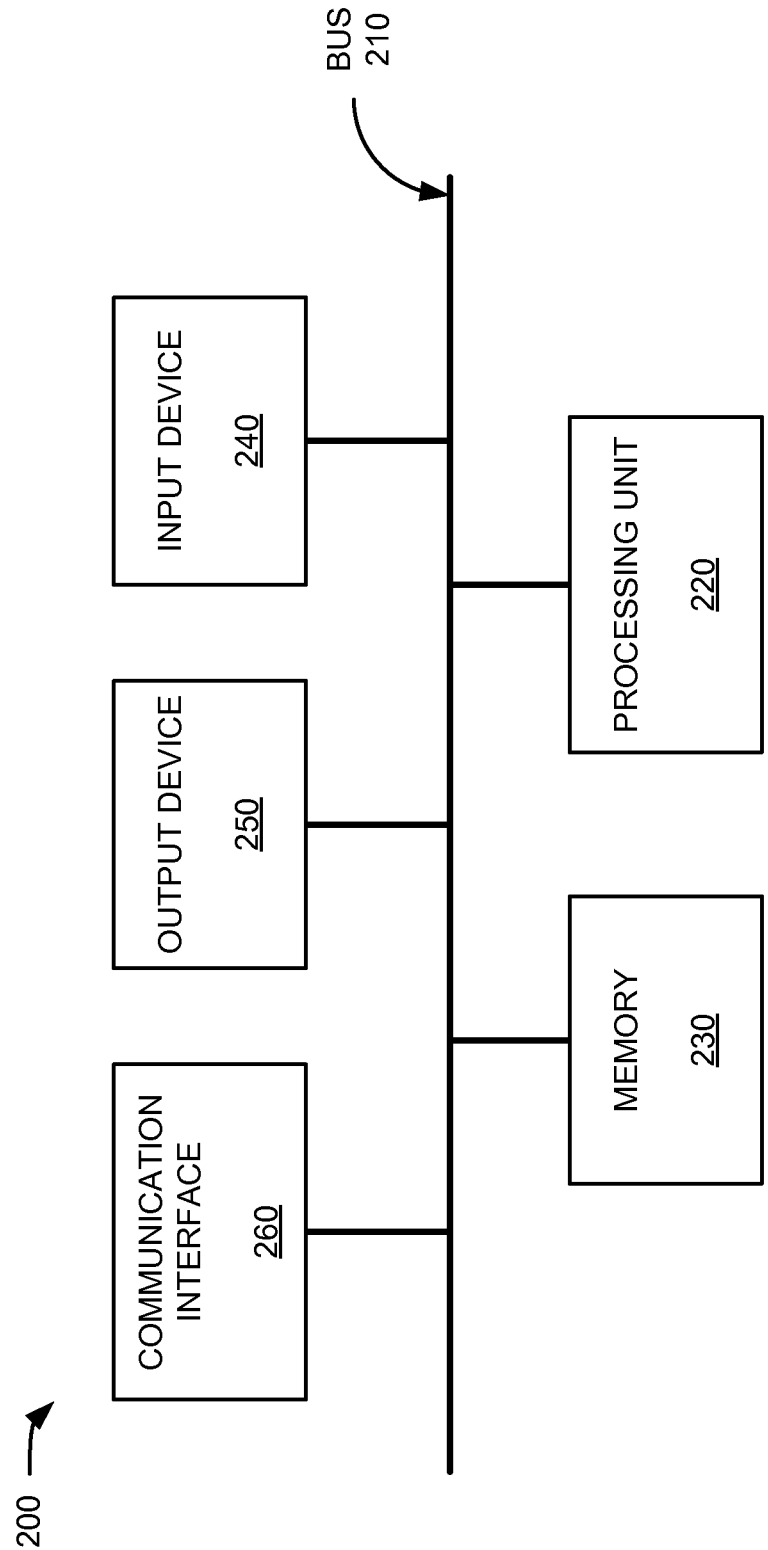

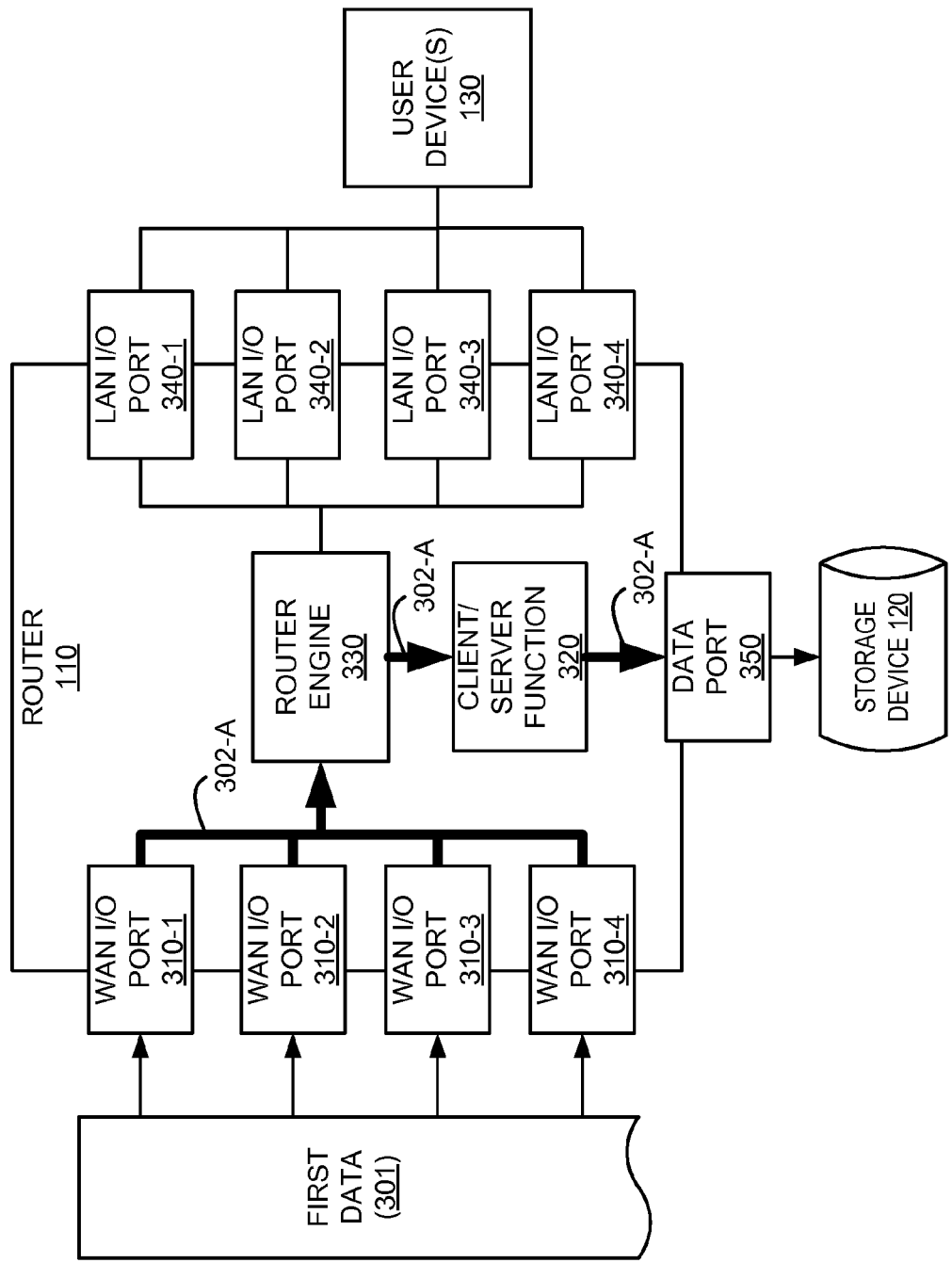

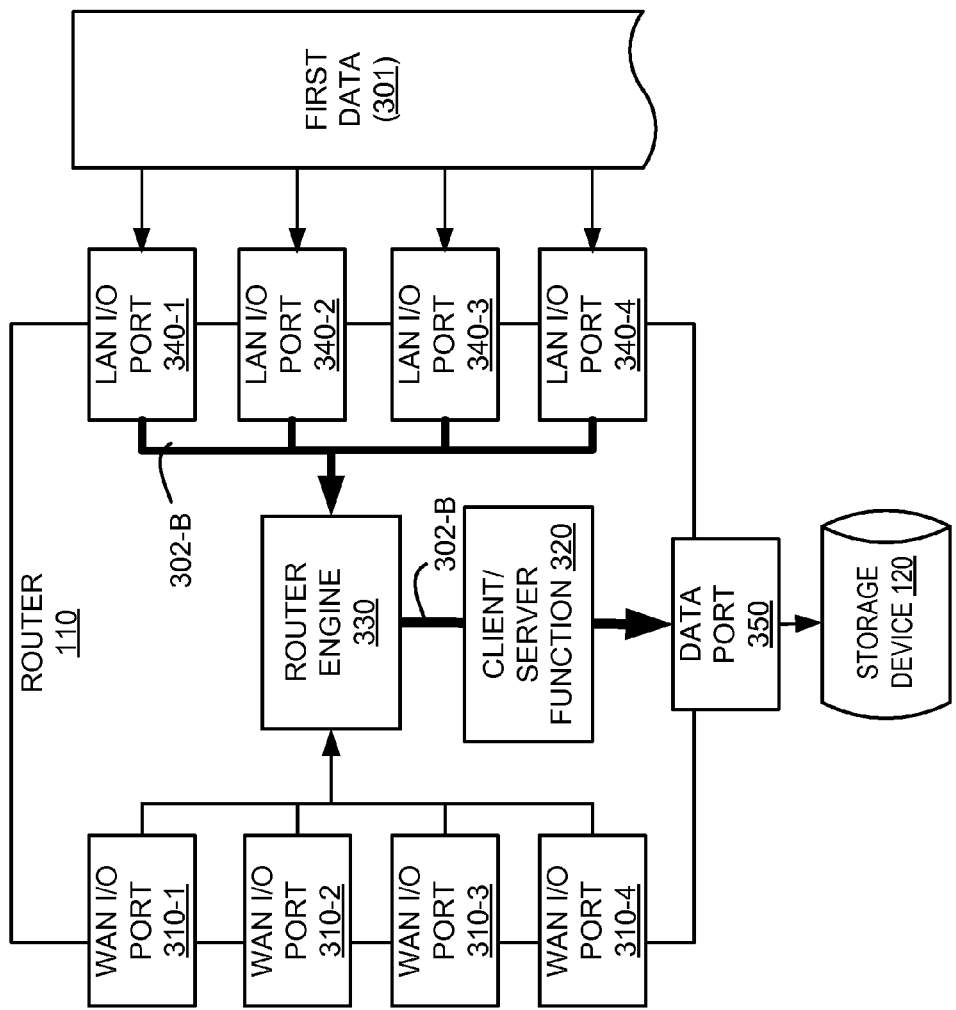

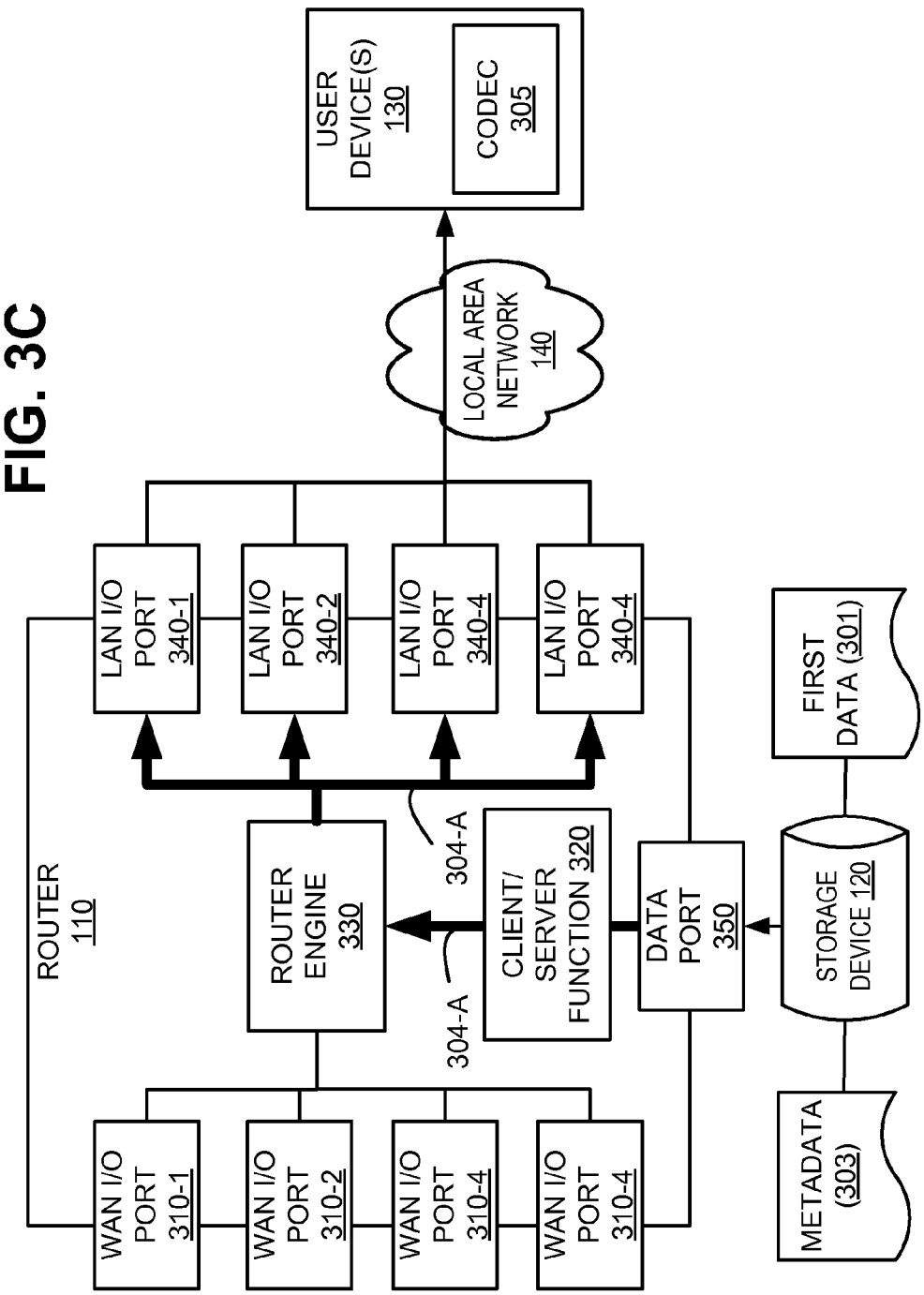

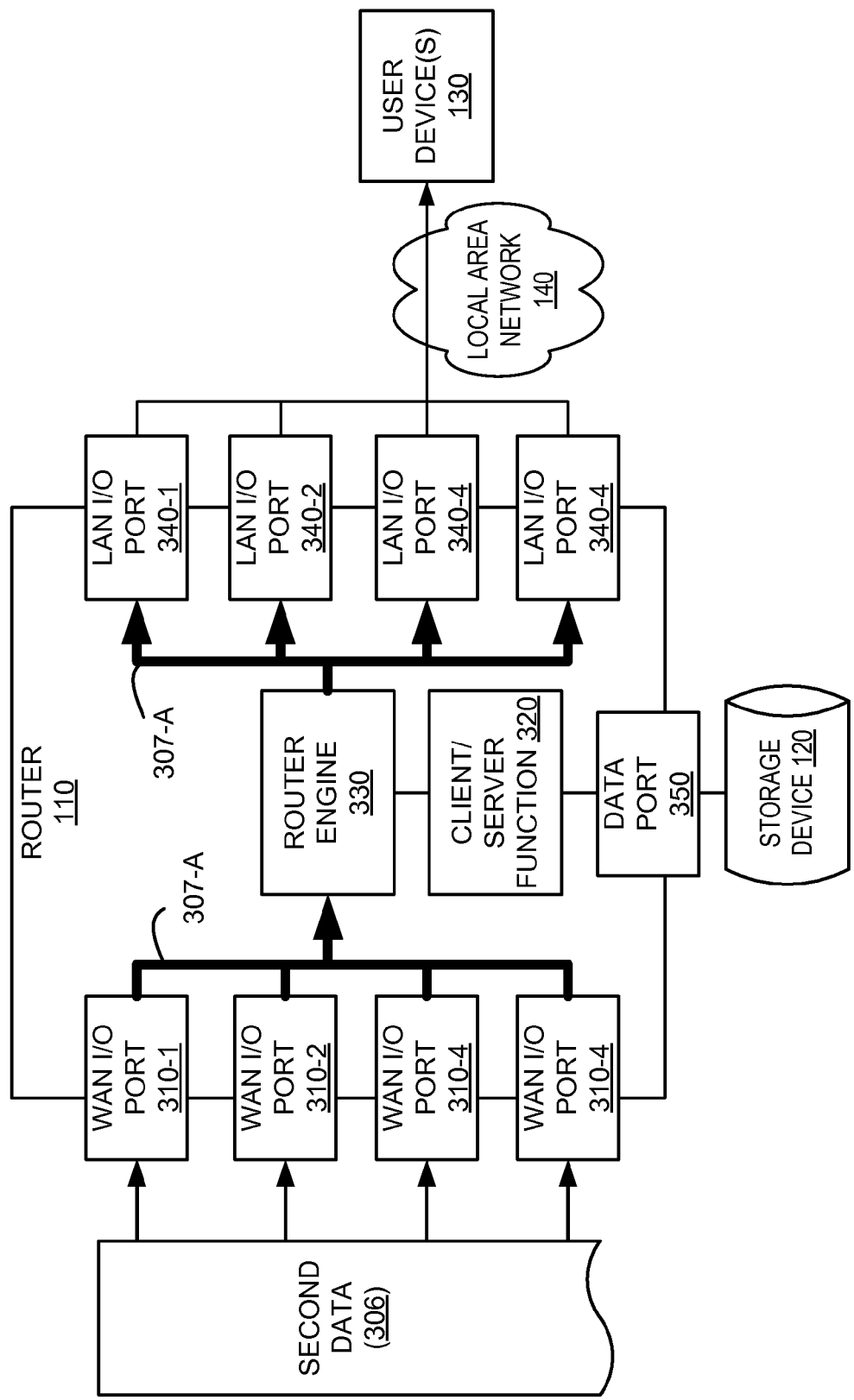

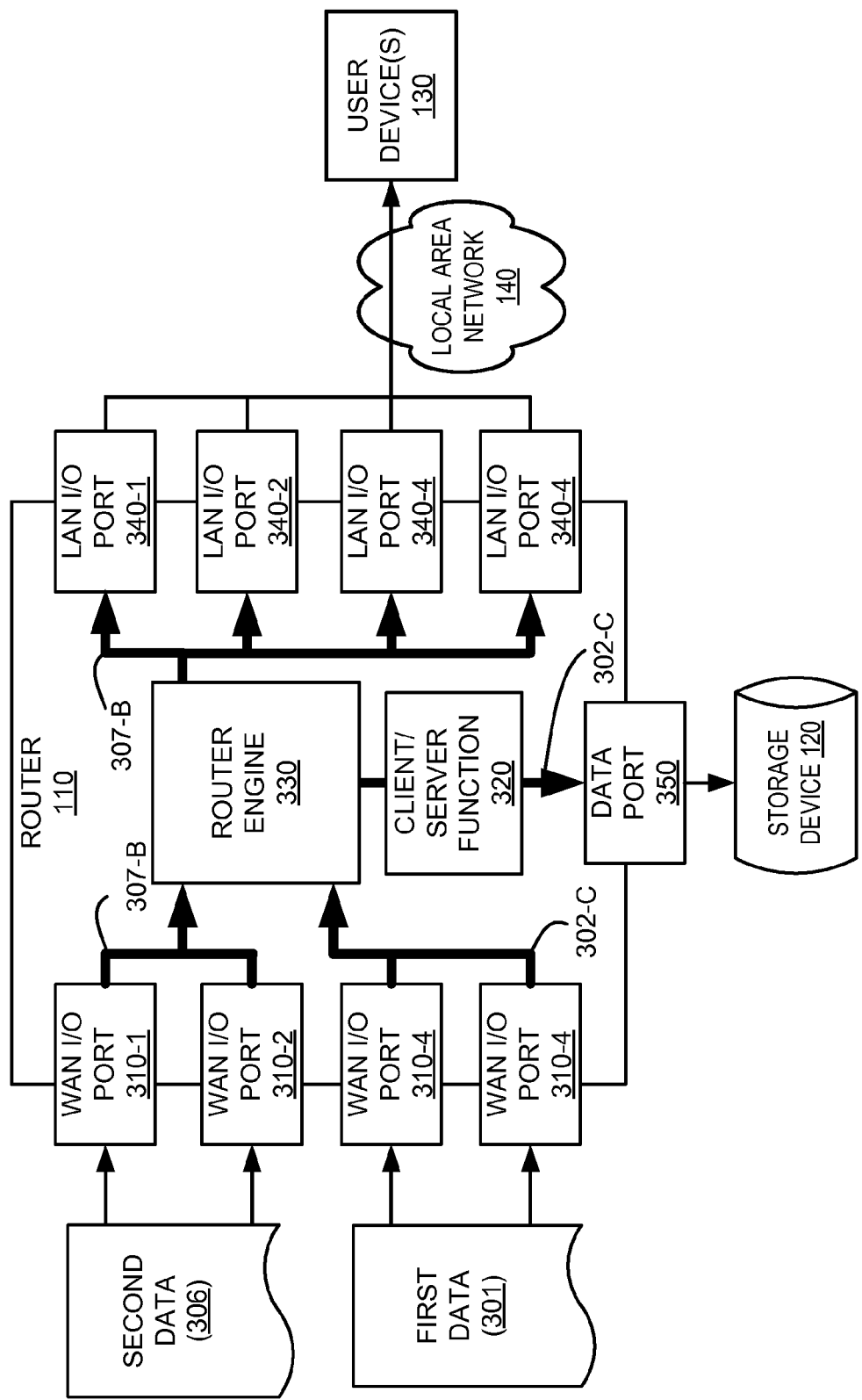

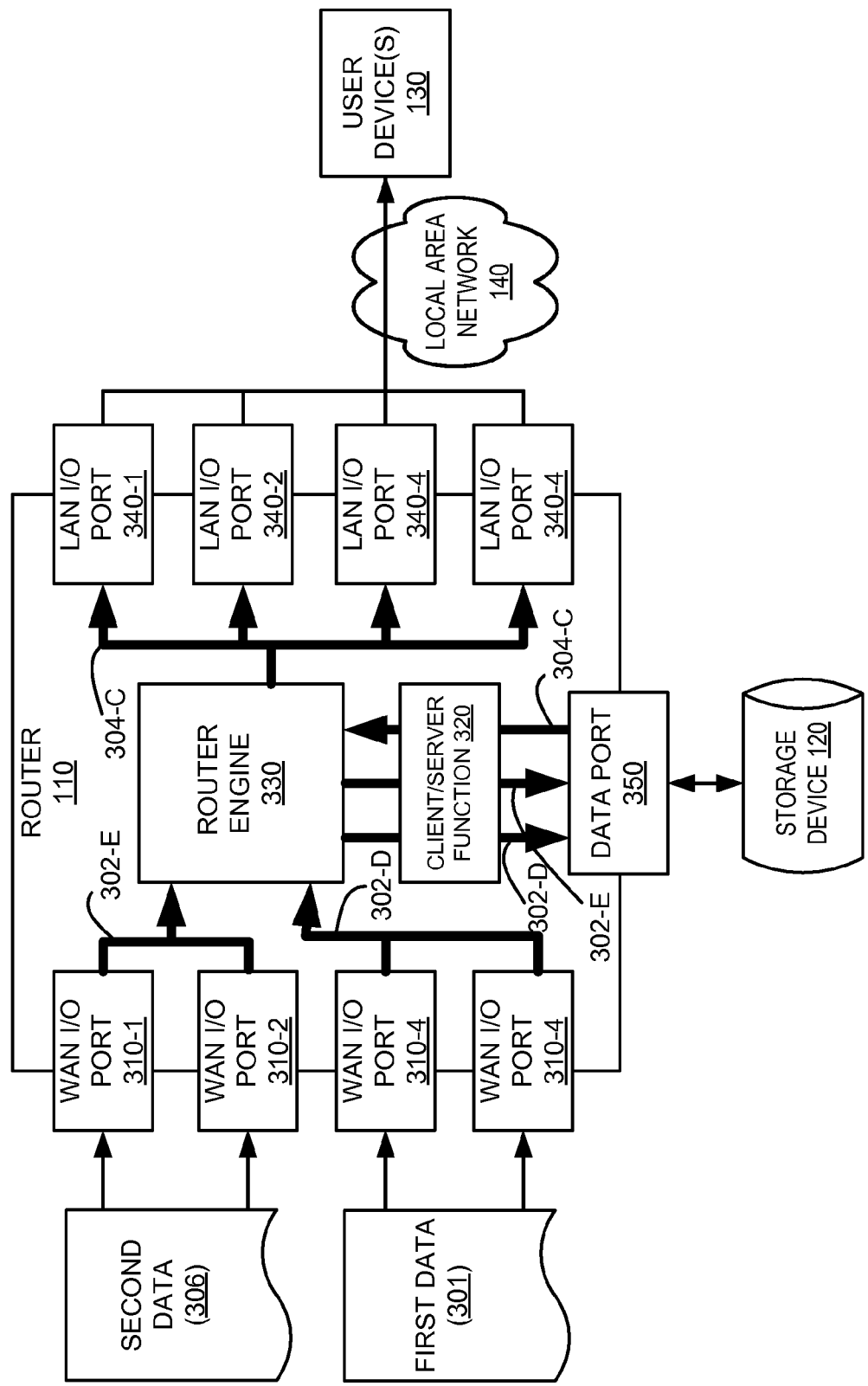

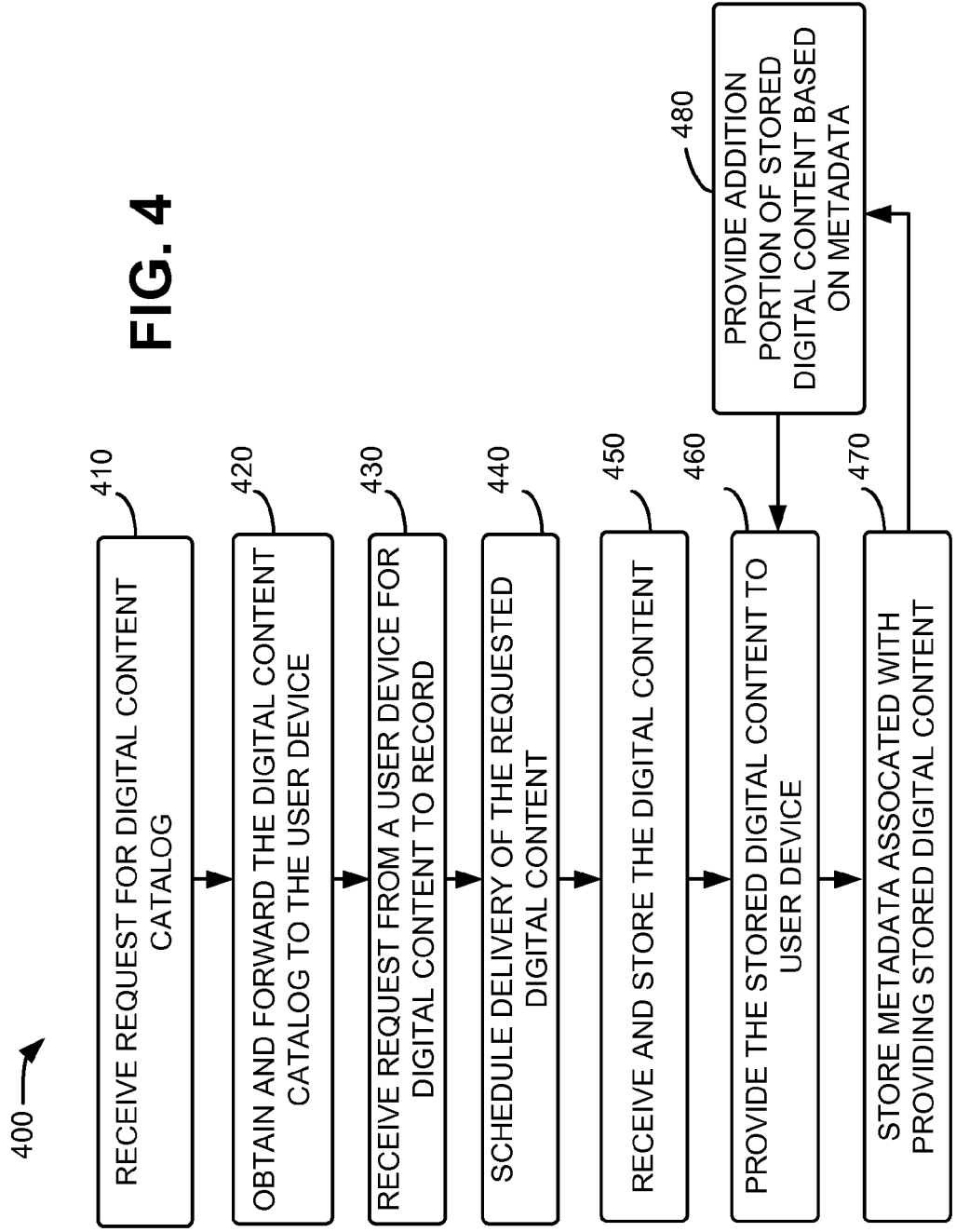

CONFIGURABLE DIGITAL CONTENT STORAGE

BACKGROUND

A digital video recorder (DVR), sometimes referred to as a personal video recorder (PVR), is an electronics device or application software that enables digital content to be captured to and played back from a local or networked storage device. A DVR may be a separate device or may be a component of another device, such as a set-top box (STB). Digital content received by the DVR may be encoded and/or encrypted to deter unauthorized access and to enforce digital rights management (DRM) requirements, such as to prevent the digital content from being copied and distributed, and the DVR may decrypt and decode the received digital content as part of storing the digital content. The DVR may also store the decoded and decrypted digital content in proprietary file systems for additional copy protection.

BRIEF DESCRIPTION OF THE DRAWINGS

FIG. 2 shows a diagram of exemplary components that may be included in one or more devices included in the environment shown in FIG. 1;

FIGS. 3A-3G show diagrams of exemplary components that may be included in a routing device included in the environment shown in FIG. 1; and FIG. 4 shows a flow diagram of an exemplary process for obtaining and recording digital content by the routing device included in the environment shown in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to a routing device that is coupled to a storage device to function as a digital video recorder (DVR) to store digital content and to enable one or more user devices to access the stored digital content.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device. "Digital content," as referred to herein, includes one or more units of digital content that may be provided to a customer. The unit of digital content may include, for example, a segment of text, a defined set of graphics, a uniform resource locator (URL), a script, a program, an application or other unit of software, a media file (e.g., a movie, television content, music, etc.), a document, or an interconnected sequence of files (e.g., hypertext transfer protocol (HTTP) live streaming (HLS) media files).

The routing device may include a client function to acquire digital content to record to the storage device. For example, a user device, such as a set-top box (STB), may forward a request to store the digital content, and the routing device may adapt the request to direct delivery of the digital content to the client function. Digital content directed to the client function may be recorded by the storage device, while other digital content (e.g., digital content directed to a particular user device) may be forwarded by the routing device to the particular user device. Digital content may be received by the routing device in an encoded and/or encrypted format, and the routing device may forward the received digital content to be recorded by the storage device in the encoded and/or encrypted format.

The routing device may also include a server function to provide the stored digital content to the one or more user devices. The routing device may use the server function to forward the recorded digital content to the user device. If the digital content is recorded by the storage device in an encoded and/or encrypted format, the accessing user device may include an application to decode and/or decrypt the recorded digital content. The routing device may further store metadata identifying a portion of the digital content accessed by a user device, and the routing device may use metadata, for example, to resume or otherwise modify playback of the digital content to the user device.

Figure 1:
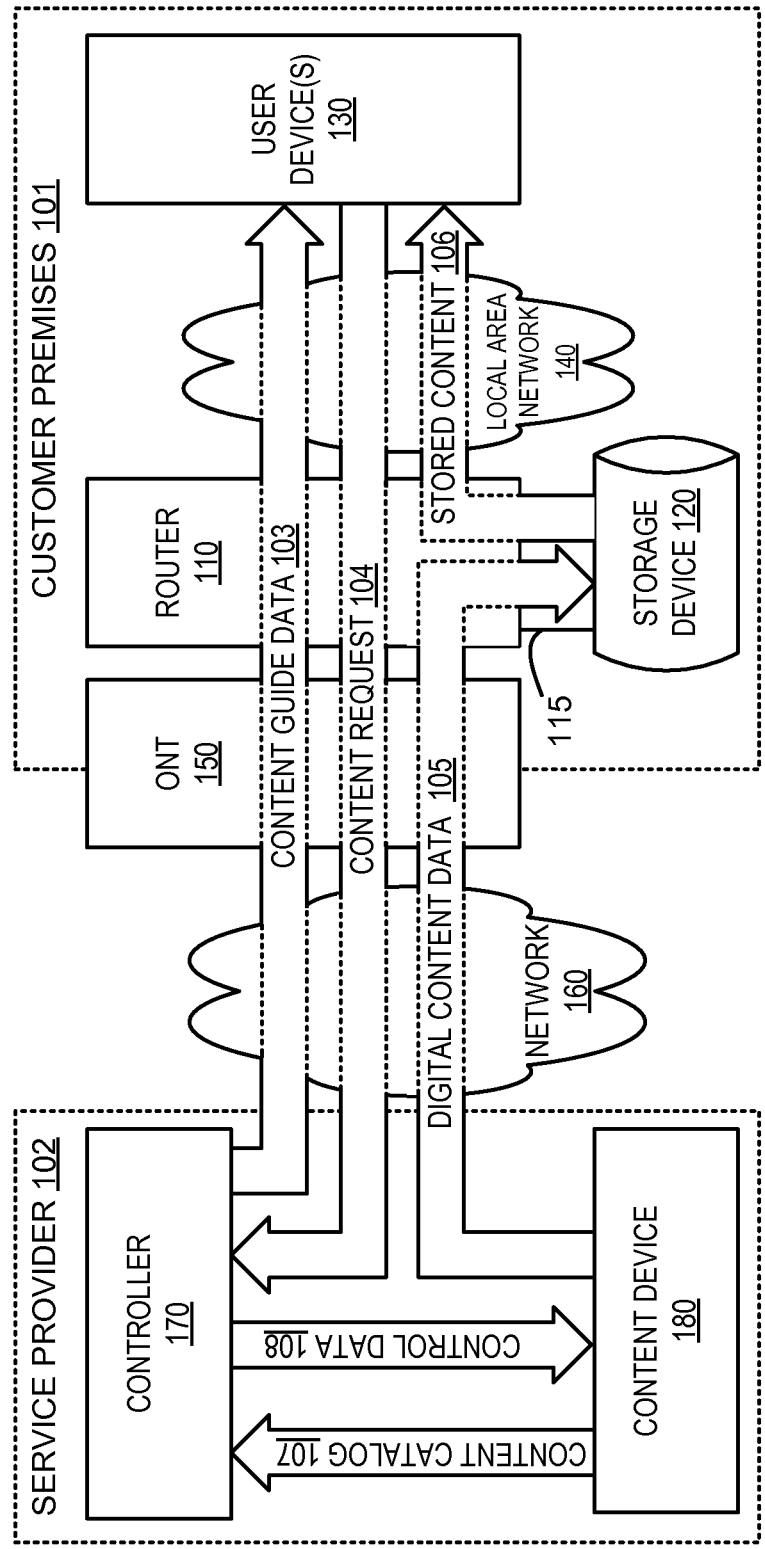
FIG. 1 shows exemplary devices that may be included in an environment in which systems and/or methods described herein may be implemented.

FIG. 1 is a diagram of an exemplary environment 100 in which systems and methods described herein may be implemented. As illustrated, environment 100 may include customer premises 101 such as a customer's home or office. As shown in FIG. 1, a routing device 110, a storage device 120, user devices 130, and a local area network (LAN) 140 may be located at customer premises 101. It should be appreciated, however, that one or more of routing device 110, storage device 120, or user device 130 may be positioned remotely from customer premises 101.

Routing device 110, also referred to as a broadband home router (BHR) or residential gateway, may act as a hub for communications between customer premises 101 and a service provider 102 via a network 160. For example, components in service provider 102 and user devices 130 (or other components in customer premises 101) may communicate via routing device 110. Routing device 110 may also enable communications between components within customer premises 101, such as forwarding stored content 106 from storage device 120 to one or more user devices 130.

As described herein, routing device 110 may receive, from service provider 102, content guide data 103 identifying digital content available to user devices 130, and routing device 110 may forward content guide data 103 to user devices 130. Content guide data 103 may be formatted, for example, as web pages to be rendered for display by user devices 130. Content guide data 103 may include information identifying titles of the available digital content, stations (or channels) providing the digital content, and times when the digital content are provided by the stations. Content guide data 103 may further include other metadata associated with the digital content, such as information identifying ratings, plot summary, actors, awards, genres, costs, future showings, and/or other information associated with the digital content.

Routing device 110 may receive a content request 104 from a user device 130 in response to content guide data 103, and routing device 110 may forward the content request 104 to service provider 102. Content request 104 may include information, such as a station name and a time, identifying digital content requested by the user device 130. Content request 104 may further specify whether the requested digital content is to be provided by routing device 110 to the requesting user device 130 or stored to storage device 120 for later access by user devices 130.

Routing device 110 may receive digital content data 105 from service provider 102 and may determine, based on content request 104, whether to provide digital content data 105 to the requesting user device 130 or to record the digital content data 105 to storage device 120 for later access by user devices 130 as stored content 106. In one implementation, routing device 110 may receive multiple streams carrying digital content data 105 from service provider 102, and routing device 110 may identify, based on prior content request 104, certain streams to provide to user devices 130 and other streams to record to storage device 120.

Storage device 120 may store data persistently and may include, for example, a data storage device using integrated circuit assemblies as memory (e.g., a state-state drive (SSD)), a magnetic recording medium (e.g., a tape drive or a hard disk drive (HDD)) and/or an optical recording medium (e.g., a digital video disk (DVD) or compact disc (CD)).

As described herein, storage device 120 may be coupled to routing device 110 by a data connection 115 to receive and store digital content forwarded by service provider 102. Data connection 115, coupling routing device 110 and storage device 120, may include a wired connection, such as a universal serial bus (USB) connection (not shown), a wireless connection (not shown) using a short-range wireless communication standard such as WiFi or Bluetooth, or via a network, such as LAN 140. In another example, storage device 120 may be included as a component of routing device 110 or may be connected to routing device 110 by a data connection, and data connection 115 may correspond to an internal bus or other type of connection.

As further described herein, storage device 120 may provide the stored content 106 to one more user devices 130 via routing device 110. For example, routing device 110 may forward stored content 106 from storage device 120 to one or more user device 130 via LAN 140. Storage device 120 may further store metadata identifying portions of stored content 106 forwarded to a particular user device 130.

User devices 130 may include any device (e.g., an Internet Protocol (IP)-based device) that is capable of communicating via a routing device 110 to obtain digital content data 105. For example, user devices 130 may include a set-top box (STB) or other device to receive content, such as television programming, VOD content, etc., and provide the content to televisions or other output devices (not shown). In one exemplary implementation, features of user device 130 may be incorporated directly within televisions or other output devices.

User devices 130 may allow users to alter the programming provided to a television based on a signal (e.g., a channel up or channel down signal, etc.) from a remote control (not shown). For example, user device 130 may present an interface, such as a graphical user interface (GUI) that displays content guide data 103 and accepts inputs (e.g., via a mouse, not shown) from the user related to issuance of a content request 104 to select digital content for streaming to customer premises 101 (e.g., for delivery to storage device 120 and/or to a user device 130).

In another example, user devices 130 include a laptop computer, a tablet computer, a notebook computer, a personal computer (PC), an ultra mobile personal computer (UMPC), a netbook, a game-playing device/console, or other types of computation or communication devices, threads or processes running on these devices, and/or objects executable by these devices. User devices 130 may also include a communication device, such as a voice over Internet protocol (VoIP) telephone (e.g., a session initiation protocol (SIP) telephone), a personal digital assistant (PDA) that can include a radio, a mobile telephone (e.g., a cell phone), a smart phone (e.g., that may combine a cellular radio with data processing and data communications capabilities), etc.

As shown in FIG. 1, user devices 130 may interact with routing device 110 and storage device 120 via a LAN 140 (e.g., a home wired or wireless network). In another implementation (not shown in FIG. 1), a user device 130 be located remotely from customer premises 101 and may connect to customer premises 101 and routing device 110 and via wired, wireless, or optical connections included in a network, such as network 160.

LAN 140 may include a wired connection, such as a multimedia over coax (MoCA) connection between routing device 110 and user devices 130. LAN 140 may also connect routing device 110 to one or more user device 130 via short-range wireless connections (e.g., WiFi®, Bluetooth®, etc.).

Network 160 may include one or more wired, wireless and/or optical networks that are capable of receiving and transmitting data, voice and/or video signals, including multi-media signals that include voice, data and video information. For example, network 160 may include one or more public switched telephone networks (PSTNs) or other type of switched network. Network 160 may also include one or more wireless networks and may include a number of transmission towers for receiving wireless signals and forwarding the wireless signals toward the intended destinations. Network 160 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

In one example, network 160 may include an optical network, and routing device 110 may receive digital content data 105 from service provider 102 via an optical network terminal (ONT) 150 that converts optical signals from network 160 to electrical signals and, in the reverse direction, converts electrical signals from routing device 110 to optical signals for transmission to service provider 102 via network 160.

Continuing with environment 100, service provider 102 may include one or more computing devices/systems, servers and/or backend systems that exchange information with customer premises 101 via network 160. As shown in FIG. 1, service provider 102 may include controller 170 and content device 180. Service provider 102 may provide, among other services, digital video content available to user devices 130. For example, service provider 102 may provide a service subscription that includes entitlements to access a particular library of media (e.g., provided from content device 180). In one implementation, the library of available digital media may include a subset from a larger collection of content. Interactions between service provider 102 and user devices 130 may be performed, for example, using hypertext transfer protocol (HTTP) or secure HTTP (HTTPS) via access network 160.

In some implementations, controller 170 may receive content catalog 107 from content device 180, and content catalog 107 may identify digital content available from content device 180. Content catalog 107 may further include information identifying, for example, times when the digital content are available, stations providing the digital content, and metadata associated with the digital content. Controller 170 may form content guide data 103 based on content catalog 107 and may forward content guide data 103 to routing device 110 for distribution to user devices 130.

Controller 170 may manage authentication, selection of content, authorization for downloading content, and/or purchase of content by a user of user devices 130. Controller 170 may also link to other backend systems to support applications residing on user devices 130. For example, controller 170 may authenticate a user who desires to purchase, rent, or subscribe to digital content (e.g., available through content device 180), such as authenticating and registering a user device 130.

In one implementation, controller 170 may permit user devices 130 to download a video application that enables a user to find content of interest and play downloaded or streaming content. Once a user device 130 is registered via controller 170, the downloaded video application may enable the user device 130 to present information received from controller 170 in an interactive format and then receive a selection of particular content. Furthermore, the video application may coordinate with content device 180 to authorize user device 130 to access the selected content.

Controller 170 may provide content guide data 103 that identifies a catalog of content (e.g., digital content provided by content device 180) for a user of user devices 130 to consume (e.g., buy, rent, or subscribe). In one implementation, controller 170 may collect content catalog 107 from content device 180 identifying digital content that are available to user devices 130. For example, content catalog 107 may include content metadata, such as lists or categories of digital content available from content device 180, and controller 170 may use the content metadata to provide content guide data 103 identifying available content options to user devices 130.

In one implementation, controller 170 may receive a login request associated with a user and may initiate a login process. Additionally, or alternatively, controller 170 may request/receive device information (e.g., a registration token) associated with user device 130 and may compare the device information with stored information to validate/authenticate user device 130.

Controller 170 may receive content request 104 from a user device 130 requesting delivery of digital content to storage device 120, the requesting user device 130, and/or another user device 130. Controller 170 may parse content request 104 to identify the digital content requested in content request 104, and controller 170 may form control data 108 to cause content device 180 to forward the requested digital content data 105 to routing device 110.

In one implementation, controller 170 may store user profile information for users (e.g., users of user devices 130). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 130, or the like. Controller 170 may use the user profile information to authenticate a user and may update the user profile information based on the user's activity.

Controller 170 may also manage charging users for services provided via service provider 102, such as performing credit card checks (e.g., for new subscriptions and/or trial subscriptions) and processing payments for subscriptions. For example, controller 170 may initiate credit card checks and receive credit card verification from an external billing entity, such as a credit card payment system (e.g., for a credit card account associated with the user) or a bank payment system (e.g., for a debit account associated with the user) associated with the user and/or user device 130, via an external payment interface (not shown). Controller 170 may also request and receive payments from the external billing entity (e.g., for monthly subscription fees, etc. associated with an account).

Continuing with FIG. 1, content device 180 may include one or more computing systems, servers, etc., that provide digital content data 105 via network 160. For example, content device 180 may stream digital content data 105 to user devices 130. In some instances, content device 180 may not be affiliated with service provider 102 (e.g., content device 180 may be associated with an independent entity that provides digital content to users/viewers).

Content device 180 may aggregate content and content metadata, process the aggregated content (e.g., format and encode the aggregated data for transmission via network 160), and distribute digital content data 105. For example, content device 180 may transcode digital content into a digital format suitable for consumption on particular user devices 130. In some implementations, content device 180 may include a transcoder (hardware or software) to convert a video file from one format to another (e.g., from one bit rate to another bit rate, from one resolution to another, from one standard to another, from one file size to another, etc) to be compatible with a user device 130. Content device 180 may also encrypt data.

Content device 180 may provide a point-to-multipoint interface that delivers multicast services to user devices 130. For example, content device 180 may use internet protocol (IP) multicast addresses for the IP flows that can be received simultaneously by users of user devices 130 who have subscribed to and have joined (e.g., via content request 104) a particular multicast group associated with a content selection associated with digital content data 105.

In connection with forming and forwarding digital content data 105, controller 170 may issue, validate, and/or enforce digital rights management (DRM) licenses to user devices 130, and content device 180 may use a related DRM encoding of the digital content. In some implementations, content device 180 may determine entitlement rights and/or other authorization parameters. Such information may be used to authorize a user to access particular content (e.g., issue a license to user device 130), and control/limit the number of concurrent viewing sessions and/or downloads for the user.

In some implementations, content device 180 may include a cable head-end, and/or a broadcaster (not shown) capable of providing digital content, advertisements, instructions, codes, encryption keys, and/or other information associated with products and/or services, etc., to user devices 130.

The exemplary configuration illustrated in FIG. 1 is provided for simplicity. It should be understood that a typical network may include more or fewer devices than those illustrated in FIG. 1. For example, service provider 102 may be connected via network 160 to numerous customer premises 101. Environment 100 may also include additional elements, such as switches, gateways, routing devices, backend systems, etc., that aid in routing information between customer premises 101 and service provider 102. Also, in some instances, one or more of the components of environment 100 may perform one or more functions described as being performed by another one or more of the components of environment 100.

FIG. 2 is a diagram illustrating exemplary components of a device 200. Device 200 may correspond, for example, to routing device 110, to each user device 130, controller 170 or content device 180 and may be implemented/installed as a combination of hardware and software on one or more devices 200. As shown in FIG. 2, device 200 may include, for example, a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as, or include, one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network environment 100. In one implementation, communications interface 260 may support short range wireless network communications (e.g., via Bluetooth protocols). In another implementation, communications interface 260 may support long range wireless network communications (e.g., cellular network services). In other implementations, communication interface 260 may support other wired or wireless network communications.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

FIGS. 3A-3G are diagrams illustrating exemplary components of routing device 110 and exemplary flows (shown in bold) of digital content data through routing device 110. As shown in FIGS. 3A-3G, routing device 110 may include, for example, wide area network (WAN) input/output (I/O) ports 310-1 through 310-4 (herein referred to individually as WAN I/O port 310 and collectively as WAN I/O ports 310), a client/server function 320, router engine 330, local area network (LAN) I/O ports 340-1 through 340-4 (herein referred to individually as LAN I/O port 340 and collectively as LAN I/O ports 340), and a data port 350

As described herein, WAN I/O ports 310 may exchange data between routing device 110 and service provider 102 (or other devices) via network 160 (e.g., through ONT 150), and LAN I/O ports 340 may exchange data between routing device 110 and user devices 130 via LAN 140. As further described herein, data port 350 may exchange data between routing device 110 and storage device 120. WAN I/O ports 310, LAN I/O ports 340, and data port 350 may include, for example, a physical connector (not shown) that receives and accepts a wire, cable, or other data pathway for carrying data and/or a wireless interface for receiving the data. WAN I/O ports 310, LAN I/O ports 340, and data port 350 may also include a buffer (not shown) for storing received data for processing and transmission. In one implementation, data port 350 may include a universal serial bus (USB) (not shown) that allows data and/or instructions to be sent from routing device 110 to storage device 120.

While FIGS. 3A-3G show that routing device 110 includes four (4) WAN I/O ports 310, four (4) LAN I/O ports 340, and a single data port 350, it should be appreciated that FIGS. 3A-3G are provided for purposes of example and routing device 110 may include any reasonable number of WAN I/O ports 310, LAN I/O ports 340, and data port 350. For example, routing device 110 may include multiple data ports 350 to connect to multiple storage devices 120.

Client/server function 320 may perform as a client (e.g., define a network address to initiate a session) to receive and store digital content (e.g., via WAN I/O ports 310) served up by service provider 102 and to perform as a server to provide the stored digital content to requesting users associated with user devices 130 (e.g., via LAN I/O ports 340). In one implementation, client/server function 320 may be included in a network file system (NFS). NFS is a distributed file system protocol allowing a user on a client computer to access files over a network. In another implementation, client/server function 320 may be included in a server message block (SMB), sometimes referred to as common internet file system (CIFS), that operates as an application-layer network protocol for providing shared access to files, printers, serial ports, and miscellaneous communications between nodes on a network, such as between storage device 120 and user devices 130.

In one implementation, controller 170 may forward instructions to configure routing device 110 to interface with storage device 120 (e.g., initiate and establish client/server function 320). Controller 170 may send the instructions using Technical Report (TR)-069 instructions. TR-069 is an application layer protocol for remote management of end-user devices and provided a bidirectional simple object access protocol (SOAP) and hypertext transfer protocol (HTTP)-based protocol for communications between customer-premises equipment (CPE), such as routing device 110, storage device 120, and user devices 130 and auto configuration servers (ACS), such as controller 170. TR-069 includes both auto-configuration and control of CPE management functions, such as to modify routing device 110 to include client/server function 320.

Router engine 330 may include, for example, a processor (such as processing unit 220) and/or software application to control the exchange of data on a switch fabric (also referred to as a crosspoint or a crosspoint switch) between WAN I/O ports 310, LAN I/O ports 340, and data port 350. For example, router engine 330 may direct data received at WAN I/O port 310 from service provider 102 to LAN I/O port 340 for transmission to a user device 130, and router engine 330 may direct data received from one user device 130 at LAN I/O port 340 to WAN I/O port 310 for transmission to service provider 102. As further described herein, router engine 330 may also direct data received at WAN I/O port 310 or LAN I/O port 340 to data port 350 for recording by storage device 120, and router engine 330 may direct data received at data port 350 (e.g., from storage device 120) to a WAN I/O port 310 (see FIG. 3D) or a LAN I/O port 340 for transmission to a user device 130.

Router engine 330 may form and maintain a routing table that identifies intended destinations for received streams of data. With respect to FIGS. 3A-3G, routing engine 330 may update the routing table to include, for example, (1) data identifying a stream of first data 301 from service provider 102 (e.g., see FIG. 3A) and intended for client/server function 320 (for recording to storage device 120); and/or (2) data identifying a stream of second data 306 from service provider 102 (e.g., see FIG. 3E) to be forwarded via LAN I/O ports 340 to one or more user devices 130.

As shown in FIG. 3A, routing device 110 may receive first data 301 via one or more WAN I/O ports 310. For example, first data 301 may be included in digital content data 105 sent from content device 180 via network 160. Router engine 330 may determine that first data 301 is intended for client/server function 320 (and not intended for a user device 130). For example, the first data 301 may be addressed to an IP address and/or a routing device port (e.g., one of WAN I/O ports 310) associated with client/server function 320. Routing device 110 may modify/generate content request 104 to direct service provider 102 to send data to user devices 130 via a first subset of WAN I/O ports 310 (e.g., WAN I/O ports 310-1 and 310-2) and send data to client/server function 320 via a second, different subset of WAN I/O ports 310 (e.g., WAN I/O ports 310-3 and 310-4).

In another example, router engine 330 may examine received digital content to determine whether the received digital content is intended for client/server function 320 or for one or more user devices 130. For example, router engine 330 may examine first data 301 to identify information (e.g., a data header field value) specifying that first data 301 is intended for client/server function 320 and/or to be stored by storage device 120.

In another example, router engine 330 may store data identifying particular digital contents to be stored by storage device 120 (e.g., intended for client/server function 320). For example, router engine 330 may parse content requests 104 to identify particular digital content to be stored by storage device 120. Router engine 330 may then inspect first data 301 to extract information identifying an associated digital content (e.g., identify an associated movie or television show) and determine whether the associated digital content is included in the particular digital contents to be stored. As part of inspecting first data 301, router engine 330 may decode/decrypt at least a portion of first data 301 and evaluate the decoded section.

In addition or alternatively, router engine 330 may determine whether a stream, forwarding first data 301, is intended for client/server function 320. For example, router engine 330 may store (e.g., in the routing table) data identifying (e.g., based on prior inspection of data in the stream) particular streams intended for client/server function 320, and router engine 330 may determine whether the stream associated with first data 301 is included in the particular streams intended for client/server function 320.

Based on determining that first data 301 is intended for client/server function 320, router engine 330 may determine a storage path 302-A between one or more of WAN I/O ports 310 to data port 350. Router engine 330 may forward first data 301 via storage path 302-A to data port 350 for transmission to storage device 120.

Storage device 120 may store first data 301 transmitted via storage path 302-A to data port 350. The data received and stored by storage device 120 may correspond to first data 301 received by routing device 110. Alternatively, client/server function 320 may process first data 301 for recording by storage device 120. For example, first data 301 may include portions of an encoded digital content, and client/server function 320 may collect and order the portions in first data 301 for recording by storage device 120. The portions of the encoded digital content, included in first data 301, may include timing and/or sequence information, and client/server function 320 may use the timing and/or sequence information to order the portions of the encoded digital content. Client/server function 320 may further decode/decrypt first data 301 and, otherwise, prepare first data 301 for access by user device 130. For example, client/server function 320 may convert first data 310 into a format that is compatible with storage device 120 and/or one or more user devices 130.

In one implementation, client/server function 320 may tag or further encode the first data 301 for storage by storage device 130. For example, client/server function 320 may add various digital rights management (DRM) information and/or instructions to first data 301 to prevent unauthorized access to the stored first data 301.

Although FIG. 3A shows that routing device 110 receives first data 301 via WAN I/O ports 310 (e.g., received from service provider 102), routing device 110 may receive first data 301 via another component. In one example shown in FIG. 3B, routing device 110 may receive first data 301 via LAN I/O ports 340 (e.g., from a user device 130), and may direct first data 301 via storage path 302-B to storage device 120. First data 301 received via LAN I/O ports 340 may correspond, for example, to personal content (e.g., home movies, pictures, documents, etc.) created by a user associated with the user device 130. In another example, first data 301 received via LAN I/O ports 340 may be acquired by a user device 130 from a data source that differs from service provider 102, such as from physical media (e.g., a digital video disc (DVD) or a BlueRay® disc) or purchased from a different vendor (e.g., an on-line store that differs from service provider 102). In addition or alternatively, first data 301 received via LAN I/O ports 340 may be acquired by a user device 130 via a pathway that does not include routing device 110 (e.g., from a mobile wireless data network that differs from network 160).

As shown in FIG. 3C, a user device 130 (e.g., located at customer premises 101) may access, via one or more LAN I/O ports 340, first data 301 stored at storage device 120. To provide the access, router engine 330 may establish an access path 304-A between data port 350 and the one more LAN I/O ports 340, and the user device 130 may access first data 301 from the one more LAN I/O ports 340 via LAN 140. Similarly, a first user device 130 (e.g., an STB) may request that the stored first data 301 be made available to another user device 130 via access path 304-A and LAN 140.

User device 130 may include a coder-decoder (CODEC) 305 to decode the first data 301 when received from routing device 110 or from storage device 120. Codec 305 is a device or program for encoding or decoding a digital data stream or signal. The codec 305 may encode a data stream or signal for transmission, storage or encryption, or may decode the data stream for playback, editing, or storage.

Continuing with FIG. 3C, client/server function 320 may further form/collect metadata 303 and store metadata 303 to storage device 120. Metadata 303 may include, for example, information identifying attributes of first data 301, such as information identifying the encoded digital content. Client/server function 320 may extract metadata 303 from first data 301 and/or from content guide data 103. Metadata 303 may also include information related to access of the first data 301 by a user device 130 (functioning as client). For example, metadata 303 may also include information identifying portions of first data 301 previously provided to the client device 130, times when first data 301 is accessed by the client device 130, a format that first data 301 was provided to the client device 130, etc. Client/server function 320 may then use metadata 303 when providing another portion of first data 301 to the client device 130, such as to enable the user device 130 to have access to first data 301 beginning at a point in the first data 301 at which a prior access by the user device 130 ended.

Figure 3D:
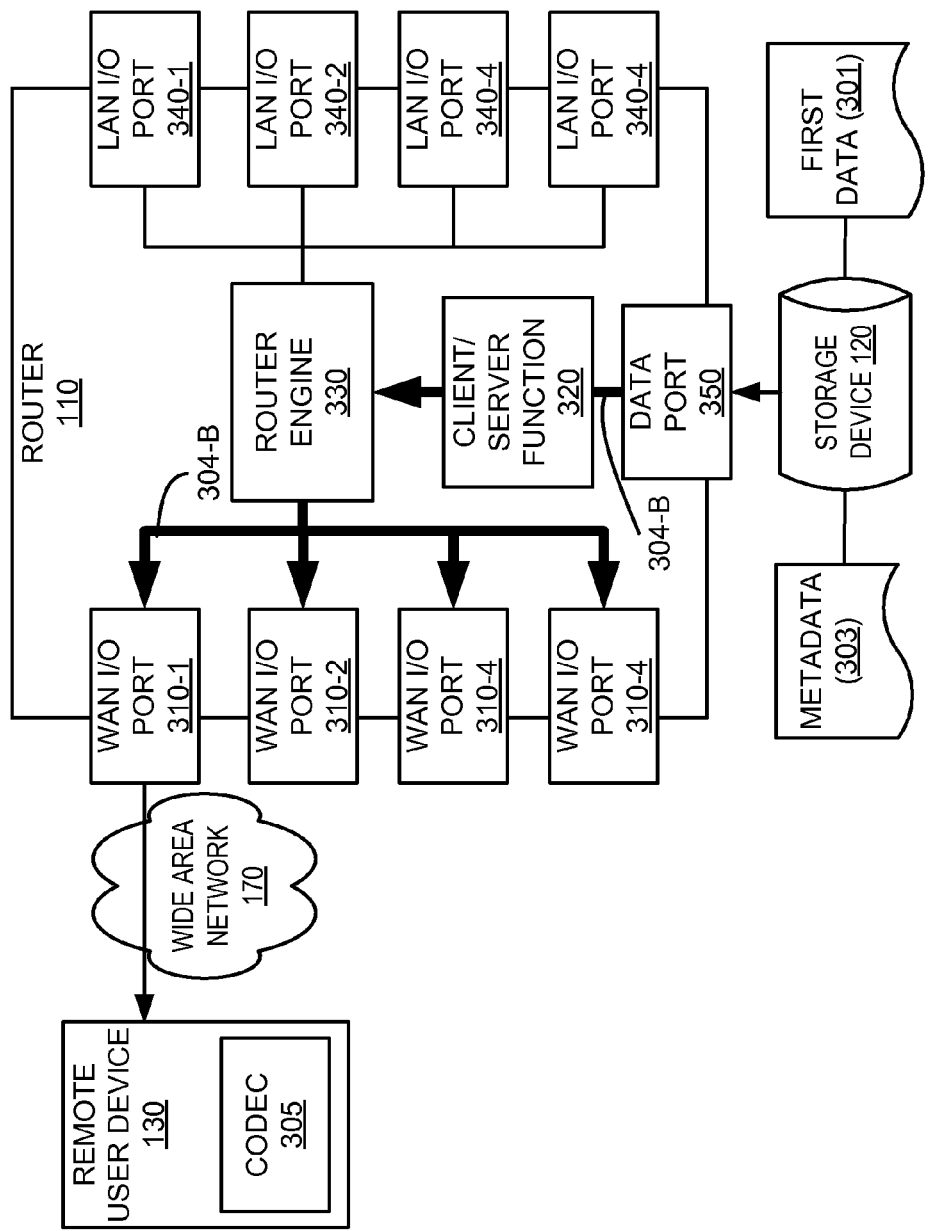

In another example shown in FIG. 3D, a user device 130 (e.g., located remotely from customer premises 101) may request to access, via one or more WAN I/O ports 310, first data 301 stored at storage device 120. In response to the access request, router engine 330 may establish access path 304-B between data port 350 and the one more WAN I/O ports 310, and the user device 130 may access first data 301 from the one more WAN I/O ports 310 and via network 160. Thus, routing device 110 may upload stored first data 301 to remote user device 130.

As shown in FIG. 3E, second data 306 may be received at one or more WAN I/O ports 310, and routing engine 330 may determine that second data 306 is intended for a user device 130 (e.g., second data 306 is not intended for client/server function 320). As described above, with respect to FIG. 3A, engine 330 may determine that second data 306 is intended for the user device 130 based on determining, for example, that (1) second data 306 is addressed to the user device 130; (2) second data 306 is carried by a stream associated with the user device 130; and/or (3) second data 306 carries data associated with digital content to be delivered to the user device 130.

In the example shown in FIG. 3E, routing engine 330 may determine a non-storage path 307-A (i.e., a path that bypasses client/server function 320) between one or more WAN I/O ports 310 and one or more LAN I/O ports 340. A user device 130 may then access second data 306 from the one more LAN I/O ports 340 via LAN 140.

In an example shown in FIG. 3F, routing device 110 may receive first data 301 at one or more WAN I/O ports 310 (e.g., WAN I/O ports 310-3 and 310-4), and routing device 110 may receive second data 306 at other WAN I/O ports 310 (e.g., WAN I/O ports 310-1 and 310-2 in FIG. 3F). Routing engine 330 may determine that first data 301 is intended for client/server function 320 and that second data 306 is intended for a user device 130. Routing engine 330 may define storage path 302-C between WAN I/O ports 310-3 and 310-4 and data port 350 and may define non-storage path 307-B between WAN I/O ports 310-1 and 310-2 and LAN I/O ports 340. In this example, routing device 110 may receive and forward first data 301 to port 350 via storage path 302-C for recording by storage device 120 while concurrently sending second data 306 via non-storage path 307-B to LAN I/O ports 340 for access by user device 130.

In another example shown in FIG. 3G, routing device 110 may again receive first data 301 at one or more WAN I/O ports 310 (e.g., WAN I/O ports 310-3 and 310-4 in FIG. 3G) and may receive second data 306 at other WAN I/O ports 310 (e.g., WAN I/O ports 310-1 and 310-2 in FIG. 3G). As with the example shown in FIG. 3F, routing engine 330 may determine that first data 301 is intended for client/server function 320 and that second data 306 is intended for a user device 130. In the example in FIG. 3G, routing engine 330 may send first data 301 to storage device 120 for long-term storage, and routing engine 330 may send second data 306 to storage device 120 for short-term storage (e.g., to buffer second data 306). For example, while accessing stored second data 306 from storage device 120, user device 130 may cause associated digital content to be repeated, slowed, skipped, fast-forwarded, etc.

Continuing with FIG. 3G, routing engine 330 may define a first storage path 302-D to carry first data 301 between WAN I/O ports 310-1 and 310-2 and data port 350 for storage in storage device 120, and may define a second storage path 302-E to carry first data 301 between WAN I/O ports 310-3 and 310-4 and data port 350 also for storage in storage device 120. Routing engine 330 may further define access path 304-C between storage device 120, data port 350 and LAN I/O ports 340 for access by user device 130 of first data 301 or second data 306 stored in storage device 120.

Although FIGS. 3A-3G show exemplary components within routing device 110, in other implementations, routing device 110 may include fewer components, different components, differently-arranged components, or additional components than those depicted in FIGS. 3A-3G. As an example, in some implementations, routing device 110 may include a scheduling component to schedule delivery of first data 301 to routing device 110 when there is adequate available bandwidth (e.g., no congestion) on network 160 between service provider 102 and routing device 110. For example, delivery of first data 301 to routing device 110 may be scheduled at night, when bandwidth used by user devices 130 is generally lower. Alternatively, or additionally, one or more components of routing device 110 may perform one or more other tasks described as being performed by one or more other components of device 110. For example, client/server function 320 may be included in storage device 120.

FIG. 4 is a flow diagram illustrating an exemplary process 400 for acquiring and storing digital content, and providing the stored digital content to a user device. In one implementation, process 400 may be performed by routing device 110. In other implementations, process 400 may be performed by one or more other devices of environment 100, such as storage device 120, user device 130, controller 170, and/or content device 180.

As shown in FIG. 4, process 400 may include receiving a request for a digital content catalog (block 410). For example, routing device 110 may receive data from a particular user device 130 indicating that an associated user has submitted an input (e.g., pressed a button on a remote control) to request the digital content catalog. In another example, the request for the digital content may be sent by the particular user device 130 without going through routing device 110. For example, the particular user device 130 may send the request via a network (e.g., a wireless data network) that differs from LAN 140 or network 160.

Continuing with FIG. 4, process 400 may include routing device 110 obtaining and forwarding the digital content catalog to user devices 130 (block 420). For example, as described above in the discussion of environment 100, routing device 110 may obtain content guide data 103 from controller 170 and forward content guide data 103 to one or more user devices 130.

Continuing with FIG. 4, routing device 110 may receive a request from user device 130 for digital content to record (block 430). For example, routing device 110 may receive data from a particular user device 130 indicating that an associated user has submitted an input (e.g., pressed a button on a remote control) identifying the digital content to record. For example, the input may select digital content identified in the digital content guide.

Process 400 may further include scheduling delivery of the requested content (block 440). For example, routing device 110 may modify the request received in process block 430 to include information identifying client/server function 320 and may forward the modified request to service provider 102 to initiate delivery of the requested content to client/server function 320. For example, the modified request may cause controller 170 to modify a multicast stream carrying the requested digital content from content device 180 at the specified time. The multicast stream may be modified to include client/server function 320 as a node in the multicast path carrying the multicast stream.

Continuing with FIG. 4, process 400 may also include receiving and storing the digital content to storage device 120 (block 450). For example, as described above with respect to FIG. 3A, routing device 110 may receive and forward digital content, intended for client/server function 320, to digital port 350 to be stored in storage device 120. The digital content may be received by routing device 110 in an encoded and/or encrypted form, and storage device 120 may store the digital content in the encoded and/or encrypted form.

Process 400 may further include providing the stored digital content to a user device 130 (block 460). For example, as described above with respect to FIGS. 3C and 3D, routing device 110 may form a data path (e.g., access paths 304-A and 304-B) between storage device 120 and the user device 130 to enable the user device 130 to access the stored digital content. User device 130 may receive data in an encoded and/or encrypted form as forwarded by content device 180 and may process the received data as necessary to access the digital content.

In connection with providing the stored digital content to user device 130 during process block 460, routing device 110 may store metadata 303 associated with providing the stored digital content (block 470). For example, metadata 303 may identify portions of the stored digital content access by different user devices 130. Routing device 110 may then provide another portion of the digital content to a user device 130 based on the metadata 303 (block 480). For example, routing device 110 may restart streaming the digital content starting, based on the metadata 303, at a point where a prior streaming of the digital content to the user device 130 ended.

While a series of blocks has been described with respect to FIG. 4, the order of the blocks in process 400 may be modified in other implementations. Further, non-dependent blocks may be performed in parallel. Furthermore, process 400 may include additional and/or fewer blocks than shown in FIG. 4. For example, process 400 may further include routing device 110 determining digital contents stored on storage device 120 and providing information identifying the stored digital contents to user devices 130.

In another implementation, process 400 may include routing device 110 receiving data and/or instructions related to implementing client/server function 320 from controller 170 or another device. For example, routing device 110 may forward a notification to controller 170 when storage device 120 is connected to router 110 (e.g., via data port 350), and controller 170 may forward the data and/or instructions related to implementing client/server function 320 based on receiving the notification.

Also, various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, in another implementation, storage device 120 may be located remotely from customer premises 101, and data port 350 may enable first data 301 to be exchanged with the remote storage device 120. For example, data port 350 and storage device 120 may connect via a wide area network, such as a wireless wide area network (WWAN).

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential unless explicitly described as such. Also, as used herein, the article "a" is intended to include one or more items. Where only one item is intended, the term "one" or similar language is used.

Further, the phrase "based on" is intended to mean "based, at least in part, on" unless explicitly stated otherwise.

What is claimed is:

1. A method comprising:
    initiating, by a routing device, a client/server function within the routing device, wherein the client/server function defines a first network address;
    receiving, by the routing device, a first request related to acquiring first digital content and a second request related to acquiring second digital content, wherein the first request indicates that the first digital content is to be stored by a storage device coupled to a data port included in the routing device, wherein the second request indicates that the second digital content is to be forwarded to a user device external to the routing device, and wherein the user device is associated with a second network address that differs from the first network address;
    modifying, by the routing device, the first request to include the first network address;
    forwarding, by the routing device, the modified first request to a multicast device, wherein the first digital content is multicast to a group of network addresses, and wherein the modified first request causes the multicast device to include the first network address in the group of network addresses;
    receiving, by the routing device, the first digital content and the second digital content, wherein the routing device and storage device are located at a customer premises, and wherein the first digital content and the second digital content are sent from at least one source that is external to the customer premises;
    establishing, by the routing device and based on receiving the first request and the second request, a first path toward the first network address and a second path toward the second network address;
    forwarding, by the routing device, the first digital content to the storage device via the first path;
    forwarding, by the routing device, the second digital content toward the user device via the second path;
    receiving, by the routing device and from the user device, a third request related to accessing the first digital content from the storage device;
    establishing, by the routing device and based on receiving the third request, a third path between the first network address and the second network address; and
    forwarding, by the routing device, the first digital content from the storage device to the user device via the third path, wherein forwarding the first digital content from the storage device to the user device includes:
        forwarding, by the routing device, a portion of the first digital content to the user device; and
        storing, by the routing device, metadata identifying the portion of the first digital content forwarded to the user device.

2. The method of claim 1, further comprising:
    providing a program guide to the user device; and
    receiving, as one or more of the first request or the second request, at least one selection from the program guide.

3. The method of claim 1, wherein the method further comprises:
    identifying a time when a bandwidth between the routing device and the at least one source exceeds a threshold value; and
    scheduling the at least one source to deliver the first digital content to the client/server function during the time.

4. The method of claim 1, wherein the portion of the first digital content is forwarded to the user device during a first time period, and wherein forwarding the first digital content from the storage device to the user device further includes:
    forwarding, based on the metadata, another portion of the first digital content to the user device during a second time period that is after the first time period.

5. The method of claim 1, wherein the data port includes a physical connector configured to receive a wire, and wherein the first path includes the wire.

6. The method of claim 1, wherein the client/server function is included in a network file system (NFS) or a server message block (SMB).

7. The method of claim 1, wherein the client/server function is configured to modify the first digital content to include digital rights management (DRM) information, and wherein the modified first digital content is forwarded via the first path to the storage device.

8. The method of claim 1, wherein initiating the client/server function within the routing device includes:
    detecting when the storage device is coupled to the routing device; and
    initiating the client/server function based on detecting the storage device being coupled to the routing device.

9. An apparatus comprising:
    a memory configured to store instructions;
    a data port; and
    a processor configured to execute one or more of the instructions to:
        initiate a client/server function within the apparatus, wherein the client/server function defines a first network address,
        receive a first request for acquiring first digital content and a second request for acquiring second digital content, wherein the first request indicates that the first digital content is to be stored on a storage device coupled to the data port and the second request indicates that the second digital content is to be forwarded to a user device external to the apparatus, and wherein the user device is associated with a second network address that differs from the first network address,
        modify the first request to include the first network address,
        forward the modified first request to a multicast device, wherein the first digital content is multicast to a group of network addresses, and wherein the modified first request causes the multicast device to include the first network address in the group of network addresses,
        receive the first digital content and the second digital content, wherein the apparatus and storage device are located at a customer premises, and wherein at least one of the first digital content and the second digital content are sent from a source that is external to the customer premises,
        establish, based on receiving the first request and the second request, a first path toward the first network address and a second path toward the second network address,
        forward the first digital content to the storage device via the first path,
        forward the second digital content toward the user device via the second path,
        receive, from the user device, a third request for accessing the first digital content from the storage device, establish, based on receiving the third request, a third path between the first network address and the second network address, and forward the first digital content from the storage device to the user device via the third path, wherein the processor, when forwarding the first digital content from the storage device to the user device, is further configured to:

forward a portion of the first digital content to the user device; and store metadata identifying the portion of the first digital content forwarded to the user device.

10. The apparatus of claim 9, wherein the apparatus further comprises:

an input port configured to receive the first digital content and the second digital content;

an output port configured to direct traffic to the user device; and a switch fabric, and wherein the processor, when establishing the first path toward the first network address and the second path toward the second network address, is further configured to execute one or more of the instructions to:

configure the switch fabric to provide at least a portion of the first path between the input port and the data port, and configure the switch fabric to provide at least a portion of the second path between the input port and the output port.

11. The apparatus of claim 9, wherein the first digital content is received in an encoded format, and wherein the storage device stores the first digital content in the encoded format.

12. The apparatus of claim 9, wherein the data port includes a physical connector configured to receive a wire, and wherein the first path includes the wire.

13. The apparatus of claim 9, wherein the client/server function modifies the first digital content to include digital rights management (DRM) information, and wherein the modified first digital content is forwarded via the first path to the storage device.

14. The apparatus of claim 9, wherein the processor, when initiating the client/server function within the apparatus, is further configured to:

detect when the storage device is coupled to the apparatus, and initiate the client/server function based on detecting the storage device being coupled to the apparatus.

15. A non-transitory computer-readable medium to store instructions, the instructions including:

one or more instructions that, when executed by a processor, cause the processor to:

initiate a client/server function within an apparatus, wherein the client/server function defines a first network address;

receive a first request for acquiring first digital content and a second request for acquiring second digital content, wherein the first request indicates that the first digital content is to be stored on a storage device coupled to a data port included in the apparatus and the second request indicates that the second digital content is to be forwarded to a user device external to the apparatus, and wherein the user device is associated with a second network address that differs from the first network address;

modify the first request to include the first network address;

forward the modified first request to a multicast device, wherein the first digital content is multicast to a group of network addresses, and wherein the modified first request causes the multicast device to include the first network address in the group of network addresses;

receive the first digital content and the second digital content, wherein the apparatus and storage device are located at a customer premises, and wherein at least one of the first digital content and the second digital content are sent from a source that is external to the customer premises;

establish, based on receiving the first request and the second request, a first path toward the first network address and a second path toward the second network address, forward the first digital content to the storage device via the first path;

forward the second digital content toward the user device via the second path;

receive, from the user device, a third request for accessing the first digital content from the storage device;

establish, based on receiving the third request, a third path between the first network address and the second network address; and forward the first digital content from the storage device to the user device via the third path, wherein the one or more instructions further cause the processor, when forwarding the first digital content from the storage device to the user device, to:

forward a portion of the first digital content to the user device; and store metadata identifying the portion of the first digital content forwarded to the user device.

16. The non-transitory computer-readable medium of claim 15, wherein the first digital content and the second digital content are received via an input port, the second digital content is transferred to the user device via an output port that differs from the data port, and the one more instructions, when causing the processor to establish the first path toward the first network address and the second path toward the second network address, is further cause the processor to:

configure a switch fabric included in the apparatus to provide at least a portion of the first path between the input port and the data port; and configure the switch fabric to provide at least a portion of the second path between the input port and the output port.

17. The non-transitory computer-readable medium of claim 15, wherein the first digital content is received in an encoded format, and wherein the storage device stores the first digital content in the encoded format.

18. The non-transitory computer-readable medium of claim 15, wherein the client/server function is included in a network file system (NFS) or a server message block (SMB) associated with the apparatus.

19. The non-transitory computer-readable medium of claim 15, wherein the client/server function modifies the first digital content to include digital rights management (DRM) information, and wherein the modified first digital content is forwarded, via the first path, from the client/server function to the storage device.

20. The non-transitory computer-readable medium of claim 15, wherein the one more instructions, when causing the processor to initiate the client/server function within the appratus, further cause the processor to:
  detect when the storage device is coupled to the apparatus; and
  initiate the client/server function based on detecting the storage device being coupled to the apparatus.

\* \* \* \* \*